(12) United States Patent
Lang et al.

(10) Patent No.: US 11,781,639 B2
(45) Date of Patent: Oct. 10, 2023

(54) OIL MANAGEMENT SYSTEM

(71) Applicant: DEERE & COMPANY, Moline, IL (US)

(72) Inventors: Matthias Lang, Mannheim (DE); David Mueller, Dettenheim (DE); Rainer Gugel, Plankstadt (DE); Stefan Raisch, Vaihingen/Enz (DE); Christoph Eisenhardt, Mannheim (DE)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 17/446,314

(22) Filed: Aug. 30, 2021

(65) Prior Publication Data

US 2022/0074483 A1     Mar. 10, 2022

(30) Foreign Application Priority Data

Sep. 10, 2020 (DE) .......................... 102020123621.2

(51) Int. Cl.
    *F16H 57/04*         (2010.01)
    *F16H 57/037*      (2012.01)
    *F16H 57/02*        (2012.01)

(52) U.S. Cl.
    CPC ....... *F16H 57/0424* (2013.01); *F16H 57/037* (2013.01); *F16H 57/0436* (2013.01);
      (Continued)

(58) Field of Classification Search
    CPC ............... F16H 57/0424; F16H 57/037; F16H 57/0436; F16H 57/0445; F16H 57/0483; F16H 2057/02013; F16H 2057/02043
See application file for complete search history.

(56) References Cited

U.S. PATENT DOCUMENTS 4,529,061 A * 7/1985 Glasrud ................ F16N 19/006
                                          184/6.12
4,915,193 A * 4/1990 Marquart ............ F16H 57/0447
                                          184/6.12
(Continued)

FOREIGN PATENT DOCUMENTS

| DE | 4414000 C1 | 1/1996 |
|----|------------|--------|
| JP | 60139969 A | 7/1985 |
| WO | WO2005059409 A1 | 6/2005 |

OTHER PUBLICATIONS

European Search Report and Written Opinion issued in European Patent Application No. 21190946.0, dated Jan. 12, 2022, 9 pages.

(Continued)

*Primary Examiner* — Michael A Riegelman

(57) ABSTRACT

An oil management system for a vehicle includes a differential housing, a transmission housing, a lubricant tank, a suction line, a lubricant pump, and an air suction pump. The transmission housing is connected to the differential housing in an air-tight manner, and a lubricant through-passage is defined between the transmission housing and the differential housing. The lubricant tank is provided in the differential housing and has a lubricant suction opening in a lower region. The lubricant pump conveys lubricant from the lubricant tank through the suction line and conducts the lubricant to the lubrication points in the differential housing and the transmission housing. The air suction pump pumps air from the lubricant tank into the transmission housing so that an excess air pressure is maintained in the transmission housing.

20 Claims, 2 Drawing Sheets

(52) U.S. Cl.
CPC ..... *F16H 57/0445* (2013.01); *F16H 57/0483* (2013.01); *F16H 2057/02013* (2013.01); *F16H 2057/02043* (2013.01)

(56) References Cited

U.S. PATENT DOCUMENTS

| | | | | |
|---|---|---|---|---|
| 6,718,847 | B2* | 4/2004 | Rimkus | F16H 57/0447 |
| | | | | 184/6.12 |
| 7,878,304 | B2* | 2/2011 | Reis | F16H 57/0447 |
| | | | | 184/6.12 |
| 8,997,934 | B2* | 4/2015 | Nielsen | F03D 80/70 |
| | | | | 184/6.12 |
| 9,052,009 | B2* | 6/2015 | Barillot | F16H 57/0471 |
| 9,103,429 | B2* | 8/2015 | Wiens | F16H 57/0483 |
| 9,297,454 | B2* | 3/2016 | Barthel | F16H 57/0495 |
| 9,377,099 | B2* | 6/2016 | Gianone | F16H 57/0447 |
| 9,927,020 | B2* | 3/2018 | Keeney | F16H 57/037 |
| 10,005,357 | B2 | 6/2018 | Hashimoto et al. | |
| 10,190,673 | B2* | 1/2019 | Creech | F16H 57/0435 |
| 11,002,356 | B2* | 5/2021 | Tochtermann | F16H 57/0409 |
| 11,226,031 | B2* | 1/2022 | Paulik | F16H 57/027 |
| 2007/0169583 | A1* | 7/2007 | Reis | F16H 57/0447 |
| | | | | 74/606 R |
| 2014/0366956 | A1* | 12/2014 | Wiens | F16H 57/045 |
| | | | | 137/204 |
| 2021/0404546 | A1* | 12/2021 | Balistreri | B60B 35/16 |
| 2022/0074483 | A1* | 3/2022 | Lang | F16H 57/0409 |
| 2022/0074486 | A1* | 3/2022 | Raisch | F16H 57/0447 |

OTHER PUBLICATIONS

European Search Report issued in application No. EP21190948.6, dated Nov. 9, 2021, 7 pages.

* cited by examiner

OIL MANAGEMENT SYSTEM

RELATED APPLICATIONS

This application claims priority to German Patent Application No. 102020123621.2, filed Sep. 10, 2020, the disclosure of which is hereby expressly incorporated by reference in its entirety.

FIELD OF THE DISCLOSURE

The present disclosure relates to an oil management system for a vehicle.

BACKGROUND

Oil management systems for vehicles have to fulfil a plurality of requirements. Components which splash in oil, namely those of a drive train or differential, generate undesired splash losses which impair the efficiency of the entire drive, which lead to increased fuel consumption and which cause an introduction of air into the lubricant. The introduction of air leads to a reduced service life of lubricant pumps due to cavitation, undesired noise development and even to a disruption in the supply of lubricant.

The quantity of lubricant also has to be correctly set. In the case of a volume of lubricant which is too small, the volume is circulated too quickly so that it is not possible to remove the introduced air and this in turn leads to an accumulation of air bubbles and foaming. In the case of volumes which are too large, more splashing occurs, whereby air is introduced once again. In order to remove heat and also to guarantee the lubricant film, however, a basic quantity of lubricant is set.

There is a need to provide an oil management system which permits a continuous lubrication and at the same time avoids splash losses or foaming.

SUMMARY

According to the present disclosure, an oil management system for a vehicle includes a differential housing, a transmission housing, a lubricant tank, a suction line, a lubricant pump and an air suction pump. The transmission housing is connected to the differential housing in an airtight manner and a lubricant through-passage is provided between the transmission housing and the differential housing. The lubricant tank is provided in the differential housing and has a lubricant suction opening in a lower region. The lubricant pump conveys lubricant from the lubricant tank through the suction line and conducts the lubricant to the lubrication points in the differential housing and the transmission housing. The air suction pump pumps air from the lubricant tank into the transmission housing so that an excess air pressure is maintained in the transmission housing. The differential housing is at ambient pressure which is lower than the excess air pressure in the transmission housing and the air pressure in the lubricant tank is lower than the ambient pressure in the differential housing so that by the air pressure differential the lubricant is conducted from the transmission housing into the differential housing and onward into the lubricant tank. The lubricant through-passage has an upper edge which is designed to regulate the lubricant level in normal operation such that this lubricant level lies below a lowest rotating transmission component.

The provision of the lubricant tank in the differential housing together with the air pressure differential provides an improved supply of lubricant. The differential transmission in this case is no longer immersed in the lubricant or in the lubricant surface which is generally formed in the prior art. By the provision of the lubricant in the tank, splash losses of the differential transmission are avoided, as well as foaming of the lubricant and a simultaneous drop in the lubricant level. The lubricant circuit extends across a plurality of housing parts and ensures a continuous lubrication with a uniform return flow into the lubricant tank. The arrangement of the lubricant tank together with the prevailing air pressure difference also leads to a low lubricant level outside the lubricant tank and a high lubricant level inside the lubricant tank in the region of the differential housing. The configuration of the upper edge of the lubricant through-passage ensures the operation of the transmission without splash losses so that the lubricant is prevented from foaming.

In one embodiment, the lubricant tank is designed to surround a differential arrangement in the differential housing, such that the lubricant in the tank is separated from the differential arrangement.

The differential arrangement consists of a plurality of gearwheels which mesh together and which supply power to the axles for the drive. The spatial separation of the lubricant reservoir in the lubricant tank avoids the situation where the gearwheels are immersed in the lubricant and reduces losses. The gearwheels are continuously supplied with lubricant but do not cause swirling of all of the lubricant which collects in the tank. The lubricant supply thus enables the quantity of lubricant to be reduced, wherein at the same time a sufficient supply is ensured.

In one embodiment, the lubricant suction opening has an upper edge which is designed to regulate the lubricant level such that in normal operation a gearwheel of the differential arrangement of the differential housing does not splash in the lubricant.

The upper edge in this case may have a specific height which is adapted to the toothing in the differential housing. By avoiding splashing, the efficiency of the drive is increased and the lubricant is prevented from foaming.

In one development, the lubricant tank is constructed in a C-shape which is suitable for enclosing a differential arrangement in the differential housing.

The design of the lubricant tank in a C-shape permits the installation in the differential housing from one direction of installation. In this case, the differential housing may have on one side an opening through which the lubricant tank may be installed. The opening may be used at the same time for maintenance purposes. The C-shape makes it possible to accommodate the lubricant tank in a space-saving manner in the differential housing, with at the same time a maximum receiving volume for the lubricant.

In one embodiment, the air suction pump suctions the air from an upper region of the lubricant tank.

The suctioning ensures a constant low pressure between the lubricant surface and the lubricant tank which is sealed in an air-tight manner. As a result, the level of the lubricant surface rises so that a continuous return flow of lubricant into the lubricant tank is ensured. The suctioning results in an air pressure differential across the lubricant tank, the differential housing and the transmission housing, wherein the lowest pressure in comparison with ambient pressure is formed in the lubricant tank. At the same time the suctioning ensures a removal of air bubbles from the lubricant, so that a uniform application of lubricant is implemented.

In one development, the lubricant tank has a through-opening which is designed to permit the through-passage of a shaft.

At the same time the lubricant tank permits an application with a shaft passing through the differential housing. This also enables an installation in applications which require a further shaft. This permits the installation of a power take-off shaft in the differential housing or the use of the transmission lubrication system in differential housings and machines designed in this manner.

In one embodiment, the lubricant pump is provided inside the differential housing.

Differential housings have a large volume which may be used in a more space-saving manner by the integration of the lubricant pump with the lubricant tank. Unused volume inside the differential housing is reduced, wherein at the same time the lubricant pump is protected from environmental influences.

In a further embodiment, the lubricant tank is designed to surround a differential arrangement such that the lubricant tank serves as a splash guard.

The lubricant tank surrounds at least one gearwheel of the differential arrangement such that the ring gear is surrounded by a wall of the lubricant tank. In this case, splashing of the lubricant is avoided in the differential housing and the lubricant drains away again more quickly and thus is available again more quickly for the circulation of lubricant.

In one development, the differential housing is directly connected to the transmission housing in an air-tight manner.

The connection which is air-tight and fluid-tight ensures the generation of the air pressure differential between the transmission housing, the differential housing and the lubricant tank. The air pressure differential ensures a continuous and uniform swirl-free drainage and return flow of the lubricant after it has been discharged to the corresponding lubricant supply lines.

In a further embodiment, the shaft is a power take-off shaft.

In particular, in the case of agricultural machines and tractors a power take-off shaft is provided in order to drive hitched machines by mechanical means. An improved use of space is possible due to the design for passing through a power take-off shaft in the lubricant tank. Specific re-routing devices for the power take-off shaft are avoided and the maintenance is reduced.

In one development, the air suction pump is uncontrolled.

The air suction pump conveys air from the lubricant tank into the transmission housing. The excess pressure prevailing in the transmission housing defines the lubricant level at the height of the upper edge of the lubricant through-passage. The air suction pump is permanently connected to the drive, wherein a shutdown is not necessary.

In one embodiment, the lubricant pump is uncontrolled.

The lubricant pump may be operated such that the conveyed volume is greater than the lubricant volume which drains out of the transmission housing. The lubricant tank may have an overflow hole which serves to permit an air exchange with the differential housing and a drainage of lubricant. In normal operation, a filling of the lubricant tank is ensured.

In one embodiment, the lubricant suction opening and the lubricant through-opening are designed such that they are at the greatest possible distance from one another.

During normal operation, the distance ensures a sufficient time which is required by the lubricant to discharge air bubbles which are present. Foaming of the lubricant is prevented and the lubricant actively in circulation may have a large volume.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawing, wherein.

Corresponding reference numerals are used to indicate corresponding parts in the drawings.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
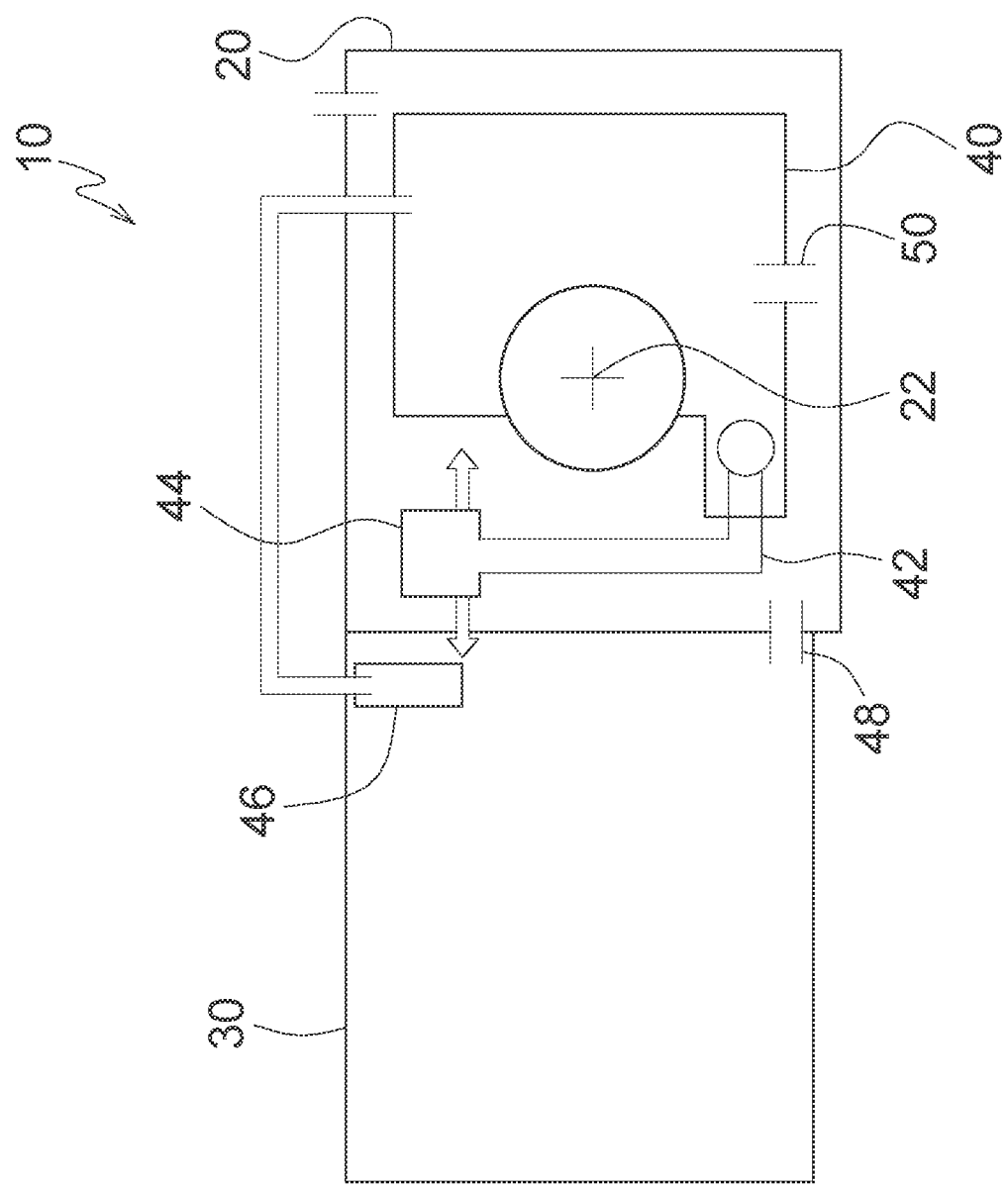
FIG. 1 shows an overall view of the construction with the transmission housing and differential housing.

The oil management system 10 in FIG. 1 comprises a differential housing 20, a transmission housing 30, a lubricant tank 40, a suction line 42 which leads to a lubricant pump 44, an air suction pump 46 which suctions air from the lubricant tank 40 and conveys the air into the transmission housing, and a lubricant through-passage which conducts lubricant from the transmission housing 30 into the differential housing 20.

The differential housing 20 contains a differential arrangement 22 for driving the wheels of an axle. The lubricant tank 40 is accommodated in the differential housing 40 such that it encloses the gearwheels of the differential arrangement 22 and thus optimally utilizes the available constructional space. The lubricant tank 40 is correspondingly shaped so that it may be inserted into the differential housing 20. A lubricant suction opening 50 which permits lubricant to flow into the lubricant tank 40 is connected in a lower region. A suction line 42 which conveys lubricant from a lower region of the lubricant tank 40 to a lubricant pump 44 is accommodated in the lubricant tank 40. The lubricant pump 44 transports the lubricant to fixed lubrication points in the transmission housing and differential housing and to further points in the vehicle mechanical system.

An air suction pump 46 is provided parallel to the connected lubricant pump 44, the air suction pump suctioning air from an upper region of the lubricant tank 40, which is not filled with lubricant, and transporting this air into the transmission housing 30. The transmission housing 30 is connected in an air-tight manner to the differential housing 20. Thus, an excess air pressure which lies both above the air pressure in the differential housing 20 and the air pressure in the lubricant tank 40 prevails in the transmission housing 30. Ambient pressure is applied to the differential housing 20 via an air vent 24. Due to the air pressure differential, the lubricant draining from the lubrication points and components is forced into the lubricant tank 40. The configuration of a lubricant sump in the differential housing is avoided.

The lubricant pump and air suction pump are controlled by a controller which may be provided on the differential housing or on the outside.

The lubricant tank 40 has a C-shaped design. This permits a space-saving accommodation in the differential housing 20 and a mounting through an opening in the differential housing 20. The lubricant tank 40 may also be adapted to the shape of the differential housing in terms of height, width and shape. The lubricant tank 40 may additionally have a drainage opening in order to be able to remove lubricant in greater quantities from the lubricant tank 40.

The transmission housing 30 may be connected to any side of the differential housing 20, as long as an option is provided for an air-tight connection to the differential housing 20.

The lubricant pump 44 may be accommodated in the differential housing 20. This lubricant pump, however, may also be mounted outside the differential housing 20 as long as the suctioning of lubricant from the lubricant tank 40 is ensured.

The air suction pump 46 may be attached inside or outside the differential housing 20 as long it is ensured that the air is suctioned from the lubricant tank 40 and pumped into the transmission housing 30.

The lubricant through-passage 48 is located between the transmission housing 30 and the differential housing 20 and permits the lubricant to flow from a lower region of the transmission housing 30 into the differential housing 20. Due to the difference in air pressure, the lubricant is forced into the differential housing 20 and flows onward into the suction opening 50 of the lubricant tank 40.

In the case of a horizontal orientation of the oil management system 10, the upper edge of the lubricant through-passage 48 is located at a lower position than the lowest rotating component in the transmission housing 30. The transmission housing 30 contains a plurality of shafts and toothings as well as couplings which are not shown in FIG. 1. A return flow of lubricant into the lower region of the transmission housing 30 is carried out by the rotation and distribution of the lubricant. In order to avoid a collection of lubricant and the formation of a lubricant sump in the transmission housing 30, the height or position of the upper edge of the lubricant through-passage 48 is selected such that no components are able to splash in the lubricant, whereby foaming is prevented.

Figure 2:
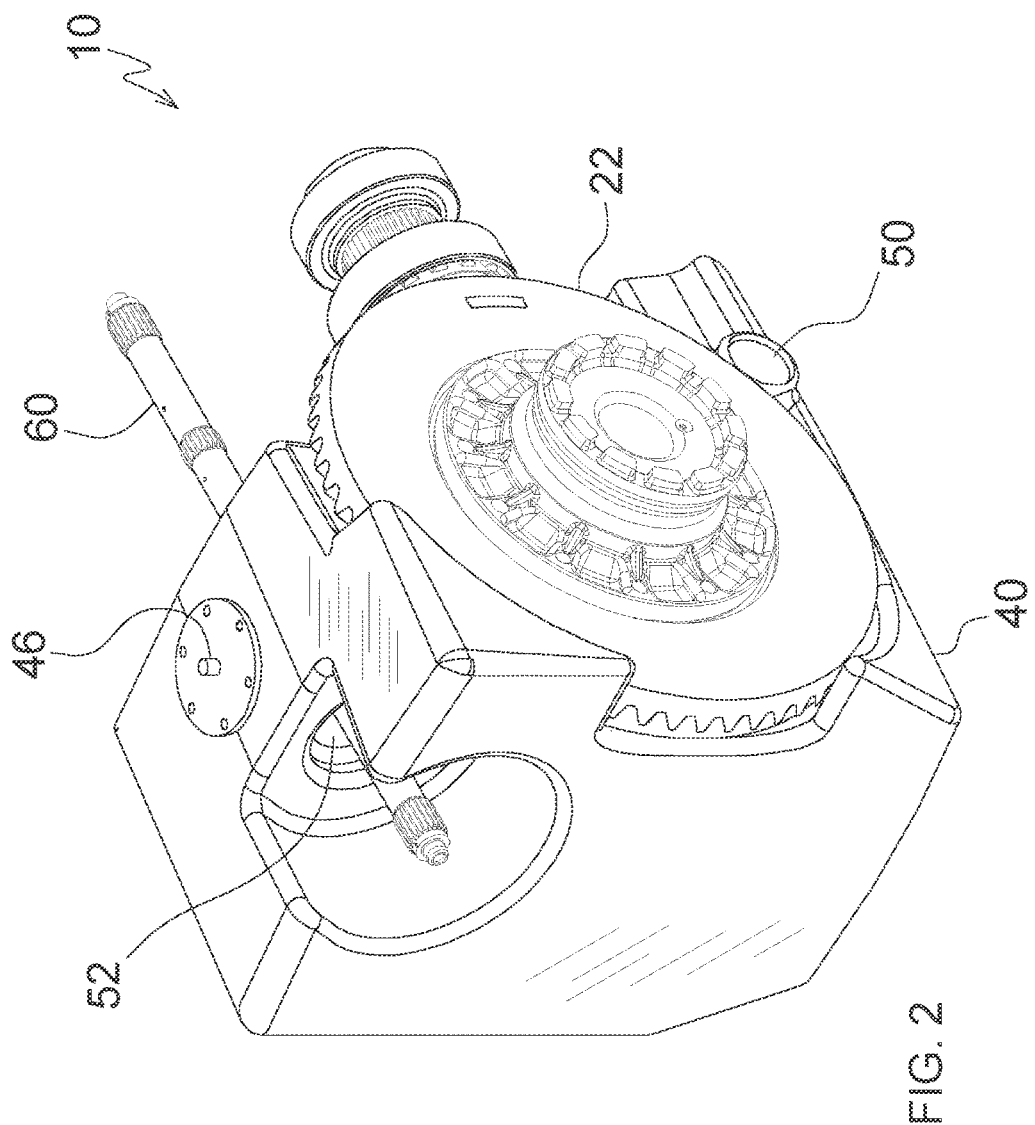
FIG. 2 shows a partial view of the lubricant tank with the differential arrangement and the shaft.

FIG. 2 shows a detailed view with the differential arrangement 22. The lubricant tank 40 has a C-shaped basic structure which also makes it possible to mount the lubricant tank from one direction. To this end, a corresponding opening may be provided in the differential housing 20.

The lubricant tank 40 is shaped such that it forms an edge which encloses and protrudes around a gearwheel of the differential arrangement 22. This edge serves at the same time as a splash guard and prevents the fine distribution of the lubricant over a wide area by the rotation of the differential arrangement 22. The lubricant tank has in a lower region a lubricant suction opening 52 which serves to suction the lubricant through the lubricant pump 44 and to conduct the lubricant to the lubrication points.

The lubricant tank 40 has a through-opening 52 which penetrates right through the lubricant tank 40. The opening 52 permits a shaft 60 to be passed through, the shaft being laid at the same time through the differential housing. By the through-opening 52, for example, a power take-off shaft, which serves for the further drive of hitched machines, may be provided. The through-opening 52 permits the space-saving design of the lubricant tank 40 and the differential housing 20.

The shaft 60 and the through-opening 52 may be configured above or below the axle of the differential arrangement 22.

The suction opening for the air suction pump 46 is located on an upper face of the lubricant tank 40. The direct suctioning of lubricant is avoided by the connection in an upper region.

A collection of lubricant over a large area on the floor of the differential housing 20 is avoided by the oil management system 10. The differential arrangement 22 is not immersed into the lubricant but is merely wetted, whereby foaming and distribution of the lubricant is prevented. The lubricant runs more quickly back into the lubricant tank 40, whereby the quantity of lubricant may also be reduced.

While embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. An oil management system for a vehicle, comprising:
a differential housing;
a transmission housing;
a lubricant tank;
a suction line;
a lubricant pump; and
an air suction pump;
wherein the transmission housing is connected to the differential housing in an air-tight manner and a lubricant through-passage is defined between the transmission housing and the differential housing;
wherein the lubricant tank is provided in the differential housing and comprises a lubricant suction opening in a lower region, the lubricant pump conveying lubricant from the lubricant tank through the suction line and conducting the lubricant to the lubrication points in the differential housing and the transmission housing;
wherein the air suction pump pumps air from the lubricant tank into the transmission housing so that an excess air pressure is maintained in the transmission housing and the differential housing is at ambient pressure which is lower than the excess air pressure in the transmission housing and the air pressure in the lubricant tank is lower than the ambient pressure in the differential housing so that by the air pressure differential the lubricant is conducted from the transmission housing into the differential housing and onward into the lubricant tank; and
wherein the lubricant through-passage has an upper edge which regulates the lubricant level in normal operation such that this lubricant level lies below a lowest rotating transmission component.

2. The oil management system as claimed in claim 1, wherein the lubricant tank surrounds a differential arrangement in the differential housing such that the lubricant in the tank is separated from the differential arrangement.

3. The oil management system as claimed in claim 2, wherein the lubricant suction opening comprises an upper edge for regulating the lubricant level such that in normal operation a gearwheel of the differential arrangement of the differential housing does not splash in the lubricant.

4. The oil management system as claimed in claim 1, wherein the lubricant tank comprises a C-shape for enclosing a differential arrangement in the differential housing.

5. The oil management system as claimed in claim 1, wherein the air suction pump suctions the air from an upper region of the lubricant tank.

6. The oil management system as claimed in claim 1, wherein the lubricant tank comprises a through-opening designed to permit the through-passage of a shaft.

7. The oil management system as claimed in claim 1, wherein the lubricant pump is located inside the differential housing.

8. The oil management system as claimed in claim 1, wherein the lubricant tank surrounds a differential arrangement such that the lubricant tank serves as a splash guard.

9. The oil management system as claimed in claim 1, wherein the differential housing is directly connected to the transmission housing in an air-tight manner.

10. The oil management system as claimed in claim 1, wherein the lubricant tank includes a through-opening designed to permit the through-passage of a shaft, and the shaft includes a power take-off shaft.

11. The oil management system as claimed in claim 1, wherein the air suction pump is uncontrolled.

12. The oil management system as claimed in claim 1, wherein the lubricant pump is uncontrolled.

13. The oil management system as claimed in claim 1, wherein the lubricant suction opening and the lubricant through-opening are spaced from one another.

14. The oil management system as claimed in claim 13, wherein the lubricant suction opening and the lubricant through-opening are spaced at the greatest possible distance from one another.

15. An oil management system for a vehicle, comprising:
a differential housing;
a transmission housing connected to the differential housing in an airtight manner, where a lubricant through-passage is defined between the transmission and differential housings;
a lubricant tank provided in the differential housing and including a lubricant suction opening in a lower region, the lubricant tank comprising a C-shape for enclosing a differential arrangement in the differential housing, where the lubricant tank comprises a through-opening designed to permit the through-passage of a shaft;
a suction line;
a lubricant pump configured to convey lubricant from the lubricant tank through the suction line and conducting the lubricant to the lubrication points in the differential housing and the transmission housing; and
an air suction pump configured to pump air from the lubricant tank into the transmission housing so that an excess air pressure is maintained in the transmission housing, and the differential housing is at ambient pressure which is lower than the excess air pressure in the transmission housing and the air pressure in the lubricant tank is lower than the ambient pressure in the differential housing so that by the air pressure differential the lubricant is conducted from the transmission housing into the differential housing and onward into the lubricant tank;
wherein the lubricant through-passage has an upper edge which regulates the lubricant level in normal operation such that this lubricant level lies below a lowest rotating transmission component.

16. The oil management system as claimed in claim 15, wherein the lubricant tank surrounds a differential arrangement in the differential housing such that the lubricant in the tank is separated from the differential arrangement.

17. The oil management system as claimed in claim 16, wherein the lubricant suction opening comprises an upper edge for regulating the lubricant level such that in normal operation a gearwheel of the differential arrangement of the differential housing does not splash in the lubricant.

18. The oil management system as claimed in claim 15, wherein the air suction pump suctions the air from an upper region of the lubricant tank.

19. The oil management system as claimed in claim 15, wherein the air suction pump and lubricant pump are uncontrolled.

20. An oil management system for a vehicle, comprising:
a differential housing;
a transmission housing connected to the differential housing in an airtight manner, where a lubricant through-passage is defined between the transmission and differential housings;
a lubricant tank provided in the differential housing and including a lubricant suction opening in a lower region, the lubricant tank comprising a C-shape for enclosing a differential arrangement in the differential housing, where the lubricant tank comprises a through-opening designed to permit the through-passage of a shaft;
a suction line;
a lubricant pump configured to convey lubricant from the lubricant tank through the suction line and conducting the lubricant to the lubrication points in the differential housing and the transmission housing; and
an air suction pump configured to pump air from the lubricant tank into the transmission housing so that an excess air pressure is maintained in the transmission housing, and the differential housing is at ambient pressure which is lower than the excess air pressure in the transmission housing and the air pressure in the lubricant tank is lower than the ambient pressure in the differential housing so that by the air pressure differential the lubricant is conducted from the transmission housing into the differential housing and onward into the lubricant tank;
wherein the lubricant through-passage has an upper edge which regulates the lubricant level in normal operation such that this lubricant level lies below a lowest rotating transmission component; and
wherein the lubricant tank surrounds a differential arrangement such that the lubricant tank serves as a splash guard.

* * * * *